(12) United States Patent
Harrison et al.

(10) Patent No.: US 10,564,761 B2
(45) Date of Patent: Feb. 18, 2020

(54) DETERMINING PITCH FOR PROXIMITY SENSITIVE INTERACTIONS

(71) Applicant: QEEXO, CO., Mountain View, CA (US)

(72) Inventors: Christopher Harrison, Pittsburgh, PA (US); Julia Schwarz, Pittsburgh, PA (US); Robert Bo Xiao, Saskatoon (CA)

(73) Assignee: Qeexo, Co., Mountain View, CA (US)

( * ) Notice: Subject to any disclaimer, the term of this patent is extended or adjusted under 35 U.S.C. 154(b) by 0 days.

(21) Appl. No.: 15/198,062

(22) Filed: Jun. 30, 2016

(65) Prior Publication Data

US 2017/0024892 A1 Jan. 26, 2017

Related U.S. Application Data

(60) Provisional application No. 62/187,807, filed on Jul. 1, 2015.

(51) Int. Cl.
*G06F 3/041* (2006.01)
*G06F 3/042* (2006.01)
(Continued)

(52) U.S. Cl.
CPC .......... *G06F 3/0416* (2013.01); *G06F 3/042* (2013.01); *G06F 3/044* (2013.01); *G06F 3/0414* (2013.01); *G06F 3/0421* (2013.01); *G06F 3/0428* (2013.01); *G06F 3/0488* (2013.01); *G06F 3/04883* (2013.01); *G06K 9/00* (2013.01); *G06T 7/73* (2017.01); *G06F 2203/04108* (2013.01)

(58) Field of Classification Search
USPC ....................................................... 345/173
See application file for complete search history.

(56) References Cited

U.S. PATENT DOCUMENTS 8,154,529 B2    4/2012   Sleeman et al.
9,013,452 B2    4/2015   Harrison et al.
(Continued)

FOREIGN PATENT DOCUMENTS

CN    105247461 A    1/2016
CN    107710111 A    2/2018
(Continued)

OTHER PUBLICATIONS

Asano, Futoshi, Goto, Masataka, Itou, Katunobu, Asoh, Hideki; Real-Time Sound Source Localization and Separation System and Its Application to Automatic Speech Recognition; Proceedings of Eurospeech, 2001; p. 1013-1016; 2001.
(Continued)

*Primary Examiner* — Chineyere D Wills-Burns
(74) *Attorney, Agent, or Firm* — Kwan & Olynick LLP

(57) ABSTRACT

Methods and apparatuses are provided for determining a pitch and yaw of an elongated interface object relative to a proximity sensitive surface. In one aspect, a proximity image is received having proximity image data from which it can be determined which areas of the proximity sensitive surface sensed the elongated interface object during a period of time. A proximity blob is identified in the proximity image and the proximity image is transformed using a plurality of different transformations to obtain a plurality of differently transformed proximity images. A plurality of features is determined for the identified blob in the transformed proximity images and the pitch of the elongated interface object relative to the proximity sensitive surface is determined based upon the determined features and a multi-dimensional heuristic regression model of the proximity sensitive surface; and a yaw is determined based upon the pitch.

16 Claims, 6 Drawing Sheets

(51) Int. Cl.
*G06K 9/00* (2006.01)
*G06F 3/0488* (2013.01)
*G06T 7/73* (2017.01)
*G06F 3/044* (2006.01)
*G06K 9/38* (2006.01)
*G06K 9/46* (2006.01)
*G06K 9/40* (2006.01)

(56) References Cited

U.S. PATENT DOCUMENTS

| | | | |
|---|---|---|---|
| 9,019,244 B2 | 4/2015 | Harrison | |
| 2004/0012573 A1 | 1/2004 | Morrison et al. | |
| 2005/0083313 A1 | 4/2005 | Hardie-Bick et al. | |
| 2005/0225541 A1* | 10/2005 | Lapstun | G06F 3/03542 345/179 |
| 2009/0079710 A1* | 3/2009 | Lapstun | B41J 2/17503 345/179 |
| 2009/0232355 A1 | 9/2009 | Minear et al. | |
| 2009/0254869 A1* | 10/2009 | Ludwig | G06F 3/038 715/863 |
| 2010/0289754 A1 | 11/2010 | Sleeman et al. | |
| 2011/0018825 A1 | 1/2011 | Kondo et al. | |
| 2011/0057670 A1* | 3/2011 | Jordan | G06F 3/0416 324/679 |
| 2011/0238613 A1* | 9/2011 | Shehory | G06F 11/3664 706/52 |
| 2011/0285648 A1* | 11/2011 | Simon | G06F 3/03547 345/173 |
| 2012/0007821 A1* | 1/2012 | Zaliva | G06F 3/03547 345/173 |
| 2012/0056846 A1 | 3/2012 | Zaliva | |
| 2012/0280927 A1* | 11/2012 | Ludwig | G06F 3/041 345/173 |
| 2013/0009896 A1 | 1/2013 | Zaliva | |
| 2013/0038554 A1* | 2/2013 | West | G06F 3/0416 345/173 |
| 2014/0240295 A1 | 8/2014 | Harrison | |
| 2014/0289659 A1 | 9/2014 | Harrison et al. | |
| 2014/0327626 A1 | 11/2014 | Harrison et al. | |
| 2015/0035759 A1 | 2/2015 | Harrison et al. | |
| 2015/0242009 A1 | 8/2015 | Xiao et al. | |
| 2016/0077615 A1 | 3/2016 | Schwarz et al. | |
| 2016/0077664 A1 | 3/2016 | Harrison et al. | |
| 2016/0085324 A1 | 3/2016 | Schwarz et al. | |
| 2016/0085333 A1 | 3/2016 | Christopher | |
| 2016/0085372 A1 | 3/2016 | Munemoto et al. | |
| 2016/0098185 A1 | 4/2016 | Xiao et al. | |
| 2016/0224145 A1 | 8/2016 | Harrison et al. | |
| 2016/0231865 A1 | 8/2016 | Harrison et al. | |
| 2016/0299615 A1* | 10/2016 | Schwarz | G06F 3/01 |
| 2017/0024892 A1 | 1/2017 | Harrison et al. | |
| 2017/0060279 A1 | 3/2017 | Harrison | |

FOREIGN PATENT DOCUMENTS

| | | |
|---|---|---|
| EP | 3105664 A1 | 12/2016 |
| EP | 3317752 A1 | 5/2018 |
| JP | 2004213312 A | 7/2004 |
| KR | 20020075283 A | 10/2002 |
| WO | 2006070044 A1 | 7/2006 |
| WO | 2015123081 A1 | 8/2015 |
| WO | 2017004262 A9 | 2/2017 |

OTHER PUBLICATIONS

Benko, Hrvoje, Wilson, Andrew, Balakrishnan, Ravin; Sphere: Multi-Touch Interactions on a Spherical Display; Proceedings of UIST, 2008; pp. 77-86; 2008.
Burges, Christopher; A Tutorial on Support Vector Machines for Pattern Recognition; Data Mining and Knowledge Discovery, 2; pp. 121-167; 1998.
Cao, Xiang, Wilson, Andrew, Balakrishnan, Ravin, Hinckley, Ken, Hudson, Scott; ShapeTouch: Leveraging Contact Shape on Interactive Surfaces; IEEE International Workshop on Horizontal Interactive Human Computer System (Tabletop); pp. 139-146; 2008.
Deyle, Travis, Palinko, Szabolcs, Poole, Erika Shehan, Starner, Thad; Hambone: A Bio-Acoustic Gesture Interface; Proceedings of ISWC, 2007; pp. 1-8; 2007.
Dietz, Paul, Harsham, Bret, Forlines, Clifton, Leigh, Darren, Yerazunis, William, Shipman, Sam, Schmidt-Nielsen, Bent, Ryall, Kathy; DT Controls: Adding Identity to Physical Interfaces; ACM Symposium on User Interface Software & Technology (UIST); pp. 245-252; 2005.
Dietz, Paul, Leigh, Darren; DiamondTouch: A Multi-User Touch Technology; ACM Symposium on User Interface Software & Technology (UIST); pp. 219-226; 2001.
Gutwin, Carl, Greenberg, Saul, Blum, Roger, Dyck, Jeff, Tee, Kimberly, McEwan, Gregor; Supporting Informal Collaboration in Shared-Workspace Groupware; Journal of Universal Computer Science, 14(9); pp. 1411-1434; 2008.
Hall, Mark, Frank, Eibe, Holmes, Geoffrey, Pfahringer, Bernhard, Reutemann, Peter, Witten, Ian; The WEKA Data Mining Software: An Update; SIGKDD Explorations, 11(1); pp. 10-18; 2009.
Harrison, Chris, Hudson, Scott; Scratch Input: Creating Large, Inexpensive, Unpowered and Mobile Finger Input Surfaces; Proceedings of UIST, 2008; pp. 205-208; 2008.
Harrison, Chris, Tan, Desney, Morris, Dan; Skinput: Appropriating the Body as an Input Surface; Proceedings of CHI, 2010; pp. 453-462; 2010.
Hartmann Bjorn, Ringel Morris, Meredith, Benko, Hrvoje, Wilson, Andrew; Augmenting Interactive Tables with Mice & Keyboards; Proceedings of UIST, 2009; pp. 149-152; 2009.
Hinckley, Ken, Song, Hyunyoung; Sensor Synaesthesia: Touch in Motion, and Motion in Touch; Proceedings of CHI, 2011; pp. 801-810; 2011.
Hinckley, Ken, Yatani, Koji, Pahud, Michel, Coddington, Nicole, Rodenhouse, Jenny, Wilson, Andy, Benko, Hrvoje, Buxton, Bill; Pen + Touch = New Tools; Proceedings of UIST, 2010; pp. 27-36; 2010.
Hinkley, Ken, Yatani, Koji, Pahud, Michel, Coddington, Nicole, Rodenhouse, Jenny, Wilson, Andy, Benko, Hrvoje, Buxton, Bill; Manual Deskterity: An Exploration of Simultaneous Pen + Touch Direct Input; Proceedings of CHI, 2010; pp. 2793-2802; 2010.
Holz, Christian, Baudisch, Patrick; The Generalized Perceived Input Point Model and How to Double Touch Accuracy by Extracting Fingerprints; Proceedings of CHI, 2010; pp. 581-590; 2010.
International Search Report and Written Opinion for PCT/US2015/014581; dated May 14, 2015.
International Search Report and Written Opinion for PCT/US2016/040194; dated Sep. 19, 2016,
Kaltenbrunner, Martin, Bencina, Ross; reacTIVision: A Computer-Vision Framework for Table-Based Tangible Interaction; Proceedings of TEI, 2007; pp. 69-74; 2007.
Matsushita, Nobuyuki, Rekimoto, Jun; HoloWall: Designing a Finger, Hand, Body, and Object Sensitive Wall; Proceedings of UIST, 1997; pp. 209-210; 1997.
Mimio; http://www.mimio.com.
Olwal, Alex, Wilson, Andrew; SurfaceFusion: Unobtrusive Tracking of Everyday Objects in Tangible User Interfaces; Proceedings of GI, 2008; pp. 235-242; 2008.
Paradiso, Joseph, Hsiao, Kai-yuh, Strickon, Joshua, Lifton, Joshua, Adler, Ari; Sensor Systems for Interactive Surfaces; IBM Systems Journal, 39(3-4); pp. 892-914; 2000.
Paradiso, Joseph, Leo, Che King; Tracking and Characterizing Knocks Atop Large Interactive Displays; Sensor Review, 25(2); pp. 134-143; 2005.
U.S. Appl. No. 14/869,998, Non-Final Office Action dated Apr. 19, 2017.
Patten, James, Ishii, Hiroshi, Hines, Jim, Pangaro, Gian; Sensetable: A Wireless Object Tracking Platform for Tangible User Interfaces; Proceedings of CHI, 2001; pp. 253-260; 2001.
Rekimoto, Jun, Saitoh, Masanori; Augmented Surfaces: A Spatially Continuous Work Space for Hybrid Computing Environments; Proceedings of CHI, 1999; pp. 378-385; 1999.

(56) References Cited

OTHER PUBLICATIONS

Rekimoto, Jun, Sciammarella, Eduardo; ToolStone: Effective use of the Physical Manipulation Vocabularies of Input Devices; Proceedings of UIST, 2000; pp. 109-117; 2000.
Rekimoto, Jun; SmartSkin: An Infrastructure for Freehand Manipulation on Interactive Surfaces; Proceedings of CHI; 2002; pp. 113-120; 2002.
Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906; 2008.
Wang, Feng, Ren, Xiangshi; Empirical Evaluation for Finger Input Properties in Multi-Touch Interaction; Proceedings of CHI, 2009; pp. 1063-1072; 2009.

* cited by examiner

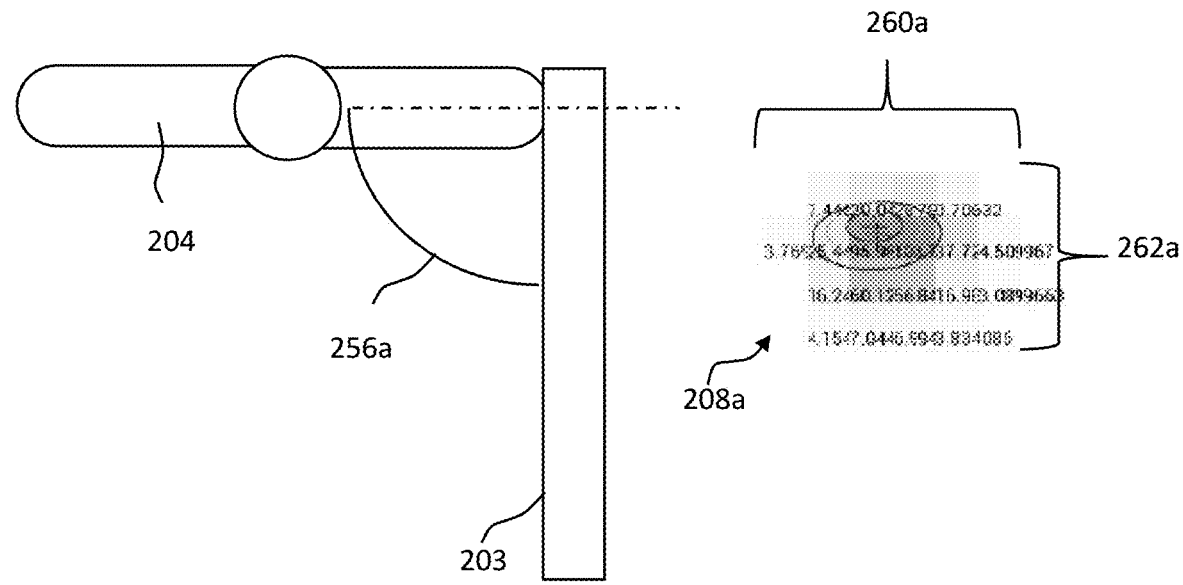
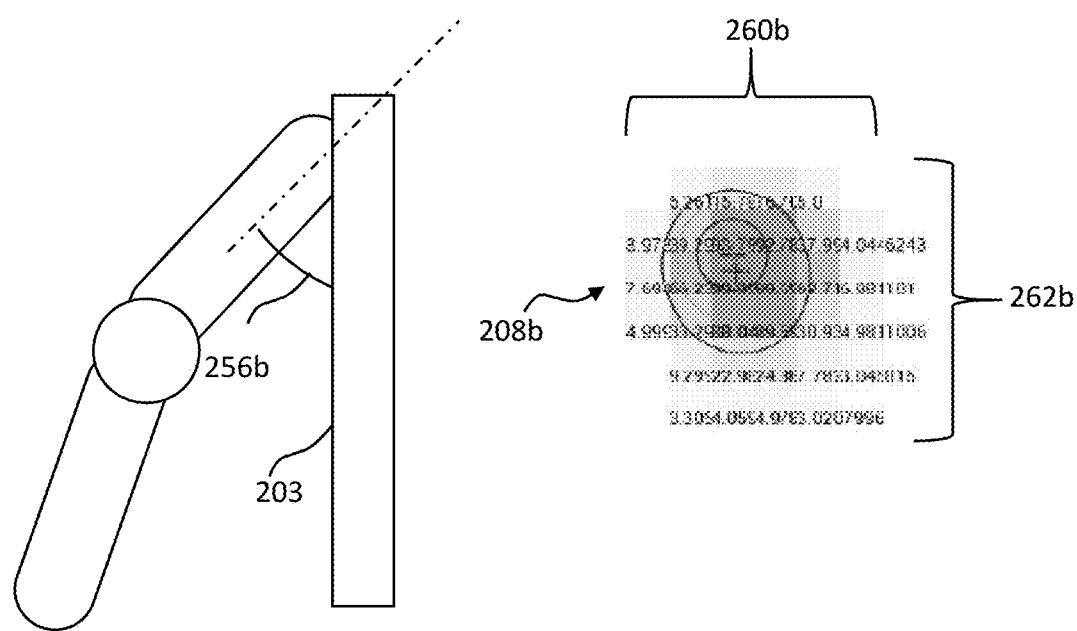
Fig. 4A  Fig. 5A
Fig. 4B  Fig. 5B

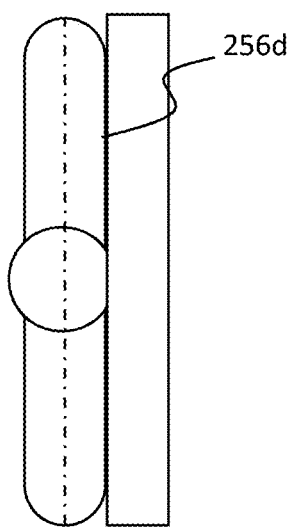
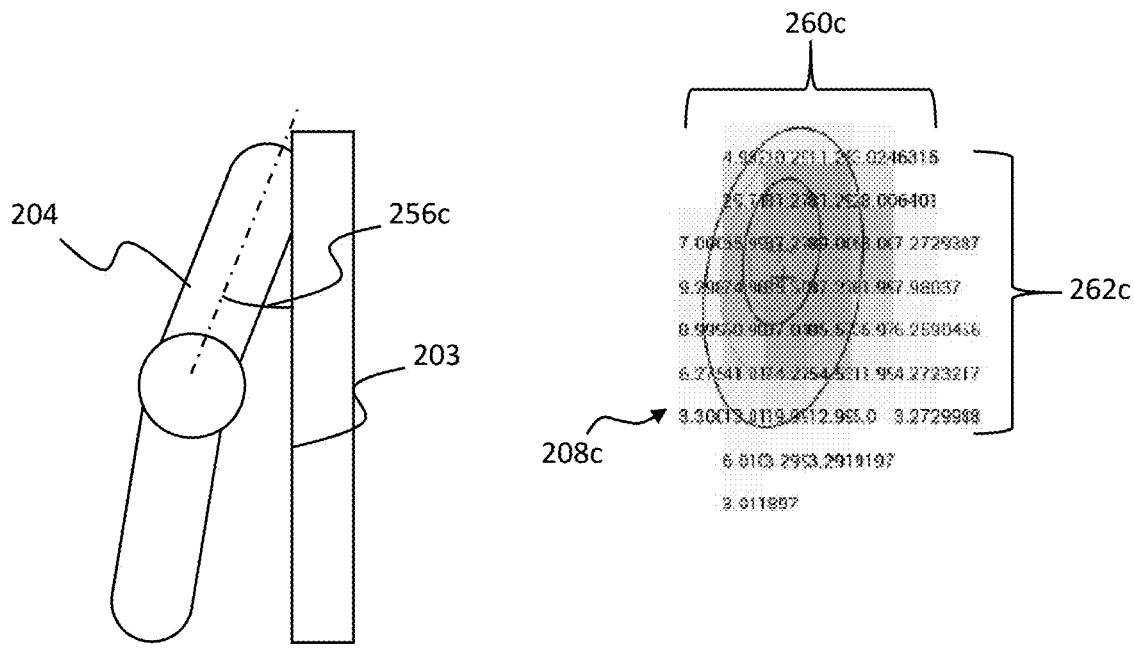
Fig. 4C
Fig. 5C
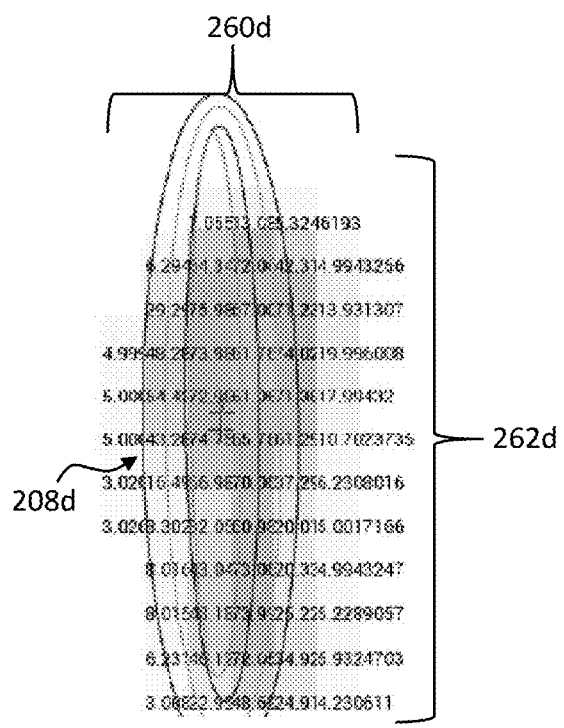
Fig. 4D
Fig. 5D

DETERMINING PITCH FOR PROXIMITY SENSITIVE INTERACTIONS

CLAIM OF PRIORITY AND CROSS-REFERENCE TO RELATED APPLICATION

This application claims the benefit of U.S. Provisional Patent Application No. 62/187,807 filed with the USPTO on Jul. 1, 2015, which is hereby incorporated by reference as if fully set forth here. Cross-reference is further made to commonly assigned and co-pending U.S. application Ser. No. 14/869,998 filed on Sep. 30, 2015 which claims priority to PCT Application No. PCT/US15/14581 filed at the National Receiving Office in the United States on Feb. 5, 2015.

TECHNICAL FIELD

The present invention relates generally to proximity sensitive devices and to techniques for utilizing proximity sensitive surfaces such as touch screens. More particularly, it relates to mechanisms and methods for analyzing image data generated from input that is received by a touch screen interface device.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The popularity of touch sensitive surfaces such as touch screen devices, of the type found in many types of tablets and smart phones, has rapidly increased. Touch screens are also being implemented with larger systems, such as laptop and desktop computers, interactive television systems, and the like. As the use of touch screens increase in diverse number of applications, techniques for reliably using touch screens have also grown.

Contemporary touch screens report X/Y coordinates of touch screen contacts to operating systems, interfaces, and various applications. Most capacitive touch screens provide a touch ellipsoid at each point contacted by a finger. The touch ellipsoid has major and minor axes. A vector of the major axis is orientation (which is related to a finger's yaw relative to the touch screen). However, the vector of the major axis is not directional, thus offering two possible yaw indications for a touch blob.

There has been significant research into enhancing interaction on touch screen devices. One approach is to use conventional x-y touch data in combination with spatial or temporal sequences, for example, tap-and-hold and multi-finger or so-called "multi-touch" chording gestures. Examples of this are described in U.S. Patent Publication No. 2007/0177803 entitled "Multi-touch gesture dictionary", in a paper entitled Shadow Guides: Visualizations for in-situ learning of multi-touch and whole-hand gestures, by Benko et al. and published in the Proceedings ITS '09, in a paper entitled "The design and evaluation of multitouch marketing menus" by Lepinski et al, and published in Proceedings CHI '10, and in a paper entitled "Experimental analysis of mode switching techniques in pen based user inter-faces by Li, et al. in Proceedings CHI '05.

Efforts to determine additional dimensions of information during a touch interaction for example pressure such as are described in a paper entitled "Pressure Marks" published by Ramos et al. in Proceedings CHI 2007, and in a paper entitled "Pressure Widgets" published by Ramos et al. in Proceedings, CHI 2007 and are being implemented in a "force touch" system in the iPhone 6s and iPhone 6S Plus smartphones sold by Apple Computer Company, Cupertino, Calif., USA, shear forces as described for example in a paper entitled "Force Gestures: augmented touch screen gestures using normal and tangential force" published by Heo et al. in Proceedings UIST 2011 and in a paper entitled "One-Point Touch Input of Vector Information from Computer Displays" published by Herot et al. in Proceedings SIGGRAPH 1978, shape of the hands as described for example in a paper entitled "Shape Touch: Leveraging contact on interactive surfaces", published by Cao, et al. in Proceedings ITS 2008, and in a paper entitled "Touch Tools: Leveraging Familiarity and Skill with Physical Tools to Augment Touch Interaction", by Harrison et al. in Proceedings CHI 2014, rolling motions of generally stationary fingers as described in a paper entitled "MicroRolls: expanding touch-screen input vocabulary by distinguishing rolls vs. slides of the thumb", published by Rodaut et al. in Proceedings CHI 2009 and what part of the finger was used to touch the screen as described for example in a paper entitled "TapSense: Enhancing Finger Interaction on Touch Surfaces", published by Harrison et al. in Proceedings UIST 2011.

It will be appreciated however that enabling more accurate determination of finger yaw during touch events enables more information to be communicated with each individual touch interaction. This, in turn, can have a number of beneficial effects including but not limited to reducing the number of touches, the need for chording and/or spatial sequences and reducing the time required to make an input. The ability to interact with a touch screen using more accurate yaw can for example reduce the need for using spatial sequences and therefore be particularly valuable in applications that have a relatively small touch screen or where only a portion of a larger screen is available for input. Further, the ability to interact with a touch screen using yaw can for example reduce the need for using temporal sequences thereby reducing the amount of time required for interactions with a touch screen. Additionally, in some instances, the ability to interact with a touch screen using more accurate yaw determinations may enable more interactions that more closely emulate familiar physical input modalities that involve twisting or rotating motions.

A variety of approaches for estimating finger yaw have been proposed. For example, some approaches attempt to determine yaw based upon video signals from cameras operating behind or above a display. Examples of this include the system described in a paper entitled "Visual touchpad: a two-handed gestural input device" published by Malik et al., In Proc. ICMI '04, 289-296 and a paper entitled "Empirical evaluation for finger input properties in multi-touch interaction", published by Wang et al. In Proc. CHI '09. 1063-1072. Systems including using finger-mounted sensors have also been described in a paper entitled "Measurement of finger posture and three-axis fingertip touch force using fingernail sensors" published by Mascaro et al. in IEEE Trans. on Robotics and Automation, 2004.

Closely related to the determination of yaw is the determination of finger pitch. This too can provide an avenue for additional input to be received from a single touch relieving the need for spatial and temporal chording when interacting with a touch sensitive device. In one example, a paper entitled "PointPose: finger pose estimation for touch input on mobile devices using a depth sensor" published by Kratz et al. in proceedings ITS 2013 used a depth camera mounted obliquely to the touch screen to capture finger "rotation and tilt". Similarly, in a paper entitled "KinectTouch: accuracy test for a very low-cost 2.5D multitouch tracking system" published by Dippon et al. in Proceedings ITS 2011 a depth camera is described but it is mounted above the display. In a paper entitled "Z-touch: an infrastructure for 3d gesture interaction in the proximity of tabletop surfaces, published by Takeoka et al, in Proceedings ITS 2010 uses a series of multiplexed infrared line lasers to create a shallow-field depth sensing touch screen, capable of recovering finger angle. Further, in a paper entitled "AnglePose: robust, precise capacitive touch tracking via 3d orientation estimation, published by Rogers et al. in Proceedings CHI described the use of a 4×6 grid of capacitive-sensing electrodes and a particle filter approach to estimate 3D finger orientation. This setup is used to evaluate how pitch/yaw information can assist in targeting, but the pitch/yaw estimates themselves were never evaluated. Finally, in a paper entitled "The generalized perceived input point model and how to double touch accuracy by extracting finger prints" published by Holtz et al in Proceedings CHI 2010 a commercial-grade fingerprint scanner is described as being used to estimate pitch and yaw based on the fingerprint patch that was visible, which was also used to improve targeting accuracy.

It will be appreciated that all of the above systems rely on special hardware beyond the touch screen to determine pitch and yaw. What are needed therefore are methods and devices that enable a data sensed by a touch screen system to be used to make more accurate determinations of pitch and yaw of a finger or other elongated object in contact therewith.

It will also be understood that there can be a significant amount of noise in x-y reporting touch screen data. This noise can be caused by variations between different types of touch screens, variations within different units of the same type, and variations caused by environmental conditions that may impact the sensitivity of the touch screens.

Accordingly, what are also needed are methods and devices that enable data sensed by an x-y reporting touch screen system to be used to make more accurate determinations of pitch and yaw despite such noise.

SUMMARY OF THE INVENTION

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Some embodiments of the present invention may include a method for determining a pitch of an elongated interface object relative to a proximity sensitive surface. In one aspect, a proximity image is received having proximity image data from which it can be determined which areas of the proximity sensitive surface sensed the elongated interface object during a period of time. A proximity blob is identified in the proximity image and the proximity image is transformed using a plurality of different transformation to obtain a plurality of differently transformed proximity image data. A plurality of features is determined for the identified blob in the transformed proximity image data and the pitch of the elongated interface object relative to the proximity sensitive surface is determined based upon the determined features and a multi-dimensional heuristic response model of the proximity sensitive surface; and a yaw is determined based upon the determined features and the determined pitch.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

FIGS. 4A-4D, illustrate finger interactions with a proximity sensitive surface at a variety of different pitches FIGS. 5A-5D illustrate hypothetical blob images obtained at the pitches illustrated in FIGS. 4A-4D respectively.

DETAILED DESCRIPTION

Figure 1:
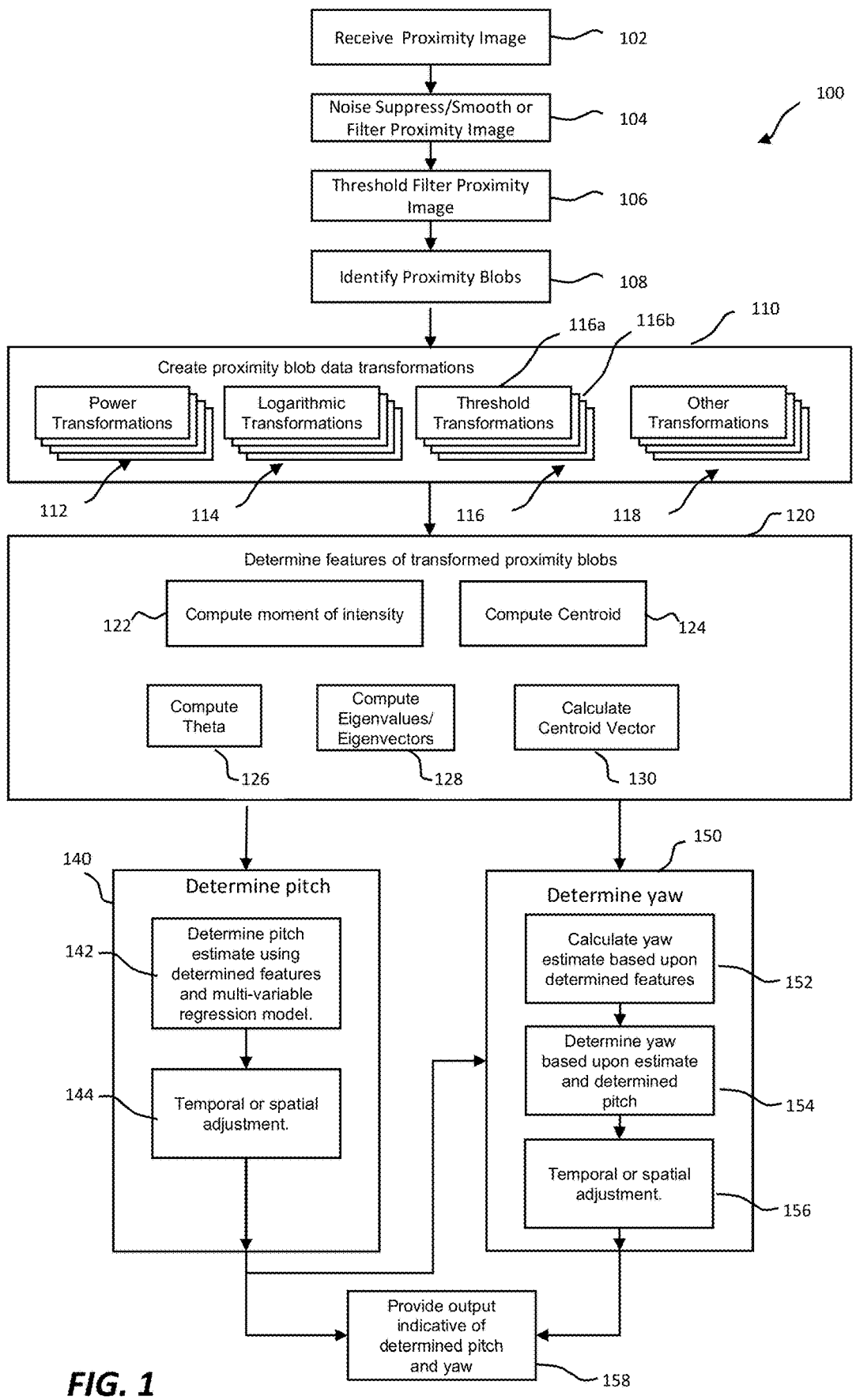
FIG. 1 is a flow chart illustrating a procedure for determining pitch and yaw of touch screen interactions in accordance with one embodiment of the present invention.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Some embodiments of the present invention provide techniques for determining a pitch of a finger, stylus, or other elongated interface object as it interacts with a proximity sensing surface. The proximity sensitive surface senses a proximate object and generates signals from which a proximity image can be determined. The proximity image has proximity image data from which portions of the proximity sensitive surface that are proximate to the elongated interface tool can be determined. Blobs are identified in the proximity image data. The proximity image data for each blob is transformed using a plurality of different transformations. Features of the transformed image data for the blob are determined and a pitch of the elongated interface object relative to the proximity sensitive surface is determined based upon the determined features and a multi-dimensional heuristic response model of the proximity sensitive surface. A yaw is determined based upon the determined features and the determined pitch.

In a non-limiting example of this, a touch screen device senses the proximity of an elongated interface object and provides proximity image data and multiple derivative proximity images are generated. Touch blob areas are identified and features of the transformed proximity image data associated with the touch blob areas are determined. A multi-dimensional heuristic response model is used to estimate a pitch of the interface object relative to the touch screen device. Pitch determined in this manner may be applied to help to determine yaw.

Some embodiments of the present invention provide techniques for determining pitch and yaw of an elongated interface object as it interacts with a proximity sensitive surface. Applications could use this additional touch data for various interactive uses. For example, games or maps could utilize a finger twist motion for zooming in and out of content, increasing or decreasing volume, to open up a photo for sharing or copying, or other functions. In one example, a finger can be rotated and twisted around a single point to adjust a shooting game's perspective (e.g., change angle of a gun's trajectory or vector). Varying pitch may be used to adjust volume, change the perspective from a top-down 2D view to a ¾ths perspective 3D view, or change speed of scrolling or a game player/action. Additionally, varying pitch may be used in a binary fashion (finger flat, or perpendicular to the screen). Toggling between a flat and steep finger pitch can be used with the trigger different modes, for example to switch between panning and zooming on a map when using one hand, switch between an off and on mode using one hand, etc. Joystick type interactions may also be possible.

Proximity image data and, typically, transformation image data sets generated based upon the proximity image data will often include fields of null or other data representing that no object is proximate to the proximity sensitive surface during a sample period. Within such fields, one or more areas having data indicative of the sensed proximity of an interface object may be identified. These areas may have various appearance shapes including but not limited to roughly circular, ovular, ellipsoid, and other shapes within the field. These are collectively referred to herein as "blobs."

The blobs in the transformation image data have a variety of features that are of value in determining pitch and optionally yaw of the interface object relative to the proximity sensing surface of these blobs the moments of the proximity image data intensity may then be computed. In one example of such a feature, an image moment may be determined for a blob. The image moment can be analogized generally to a weighted average of the intensity values for transformation image data within a region the transformation image data associated with a blob. Other features that can be computed from a blob's moment is its centroid and orientation. Using the moments, a series of image features may then be determined for each blob. For example, a centroid of an a first transformation may be computed as features, while alternatively or additionally, a centroid of a second transformation image may also be computed as features. These examples of useful blob features are not limiting.

In other, non-limiting examples of such features, a magnitude of the first eigenvalue for a blob may be computed from a transformation image. On other examples, features can include a correlation between a length of the blob and a first eigenvalue. Other blob features can include a blob eccentricity which can optionally be used to normalize the first eigenvalue. Another feature may include a blob eccentricity that is averaged with the magnitude. In other alternative embodiments, the distance between first- and second transformation-derived centroids for a blob may be determined as features.

The determined features are applied to a multi-dimensional heuristic regression model of such features to determine a pitch. The multi-dimensional model may take any of a number of different forms.

A yaw is determined based upon the determined pitch. In one aspect, a yaw estimate may be determined and a first yaw may be determined based upon the yaw estimate when the determined pitch is within a first range of features, while a second yaw may be determined when the determined pitch is within a second range of features. In a pitch data is an input into a mathematical function that determines in part the yaw data. In another aspect, the pitch data and may be an input into a mathematical function that determines in part the yaw data, and in still other aspects, determined pitch data may be an input into a heuristic model that in part determines the yaw data.

Some embodiments of the present invention pertain to an apparatus having at least a processor and an input. The processor and input are configured to perform one or more of the above described operations. Device drivers capable of performing one or more of the above described operations are also described in embodiments. In another embodiment, the invention pertains to at least one computer readable storage medium having computer program instructions stored thereon that are arranged to perform one or more of the above described operations.

Proximity Image Data Retrieval and Processing

FIG. 1 is a flow chart illustrating a procedure 100 for determining pitch and yaw of an elongated object proximate to a proximity sensitive surface in accordance with one embodiment of the present invention. As shown, a proximity image is initially received in operation 102. This proximity image data may be received from a touch screen, proximity sensitive surface such as a graphics pad, a touch controller, sensor hub, hardware controller, and/or operating system. Several proximity sensing technologies are able to provide proximity "images", which are two-dimensional spatial representations of which portions of a proximity sensitive surface sense an object proximate thereto. Examples of proximity sensitive surface technologies include capacitive sensing (e.g., surface, projected, mutual- or self-capacitive), optical sensing (e.g., diffuse illumination, frustrated total internal reflection, in-pixel sensing, infrared grid, infrared acrylic projection), and force-sensitive element based screens (e.g., a pattern of force-sensitive resistors). Proximity sensitive surfaces may be co-aligned with a display such as in a so-called touch screen or they may be stand alone.

Regardless of technology, the proximity image has proximity image data therein from which it can be determined which areas of the proximity sensitive surface sensed the elongated interface object during a predetermined period of time. The proximity image (or multiple proximity images) may be obtained in response to an object, such as a finger or stylus, being positioned on or near a proximity sensing surface. Multiple proximity images for multiple objects interacting with the proximity sensitive surface may be obtained simultaneously or consecutively.

Figure 2:
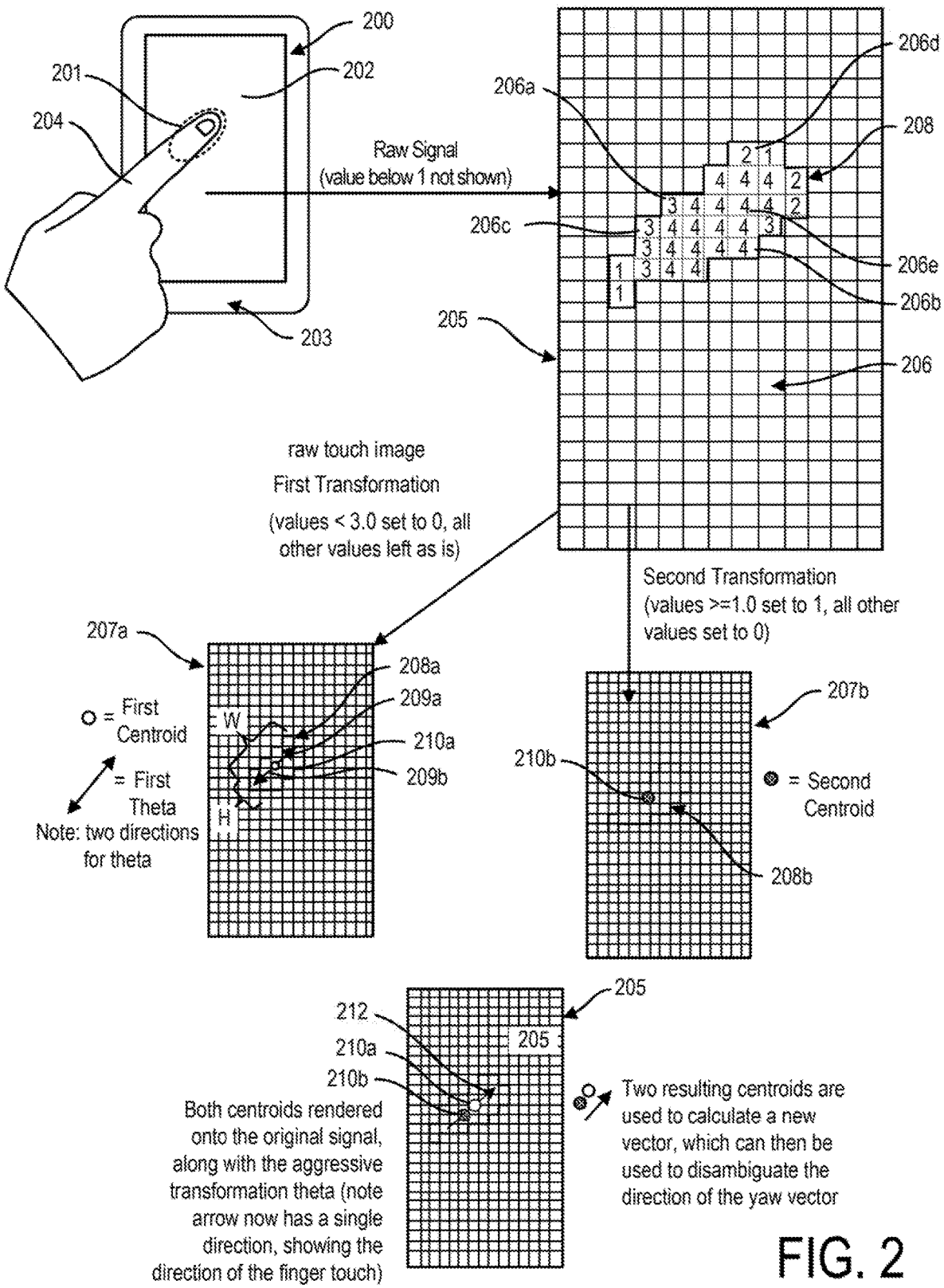
FIG. 2 includes diagrammatic representations of the touchscreen input analysis process of FIG. 1 in accordance with one embodiment of the present invention.

FIG. 2 includes diagrammatic representations of a proximity sensitive surface input analysis process of FIG. 1 in accordance with one embodiment of the present invention. As is shown, FIG. 2 a finger 204 (or other tool or object) is positioned so that a portion 201 of finger 204 (or other tool or object) is located proximate to and/or in contact with proximity sensitive surface 203 which, in this embodiment, is shown as a part of an interactive display 202 in an interactive device 200. Proximity sensitive surface 203 alone or in combination with conventional devices such as analog to digital converters, sensor drivers and/or sensor hubs generates proximity image data 205.

Proximity image data in proximity image 205 is generally comprised of data representing the intensity or other sensed characteristics of proximity at each of a plurality of patches, pixels, or areas 206 (hereby collectively referred to as pixels henceforth) that each corresponds to different locations on a proximity sensitive surface 203 of interactive display 202. Each pixel 206 may have a data value such as an intensity value that can correlate with an amount of proximity-based measurement, e.g., capacitance (or other type of intensity or proximity measurement, depending on the touch screen technology used) sensed in a portion of proximity sensitive surface associated with the pixel when a portion 201 of finger 204 touches or is located proximate to proximity sensitive surface 203 of interactive display 202 during a particular period of time. In this example, a black color corresponds to a high amount of measured capacitance (or other signal that corresponds to object proximity/touch), while a white color corresponds to a low amount of measured capacitance. In FIG. 2 varying gray levels correspond to a gradation of measured capacitance values that range between these two extremes.

Pixels 206 can also be associated with a variety of intensity scales, such as for example and without limitation 0-200 with 0 being representing no contact or sensed proximity and 200 being the most contact or sensed proximity between the object and the touch screen is, or 0.0 being no contact and 1.0 being most contact. Of course, these scales and color associations are arbitrary and any other scales or colors can be associated with different degrees of contact between the object and the touch screen. For instance, in the example of FIG. 2, lighter gray pixels 206a~206c (having value 2) may correspond to portions of finger 204 which are merely hovering over, as opposed to touching, interactive display 202. Darker pixels 206d and 206e (having values 3 and 4) correspond to portions of the finger area 201 that are actually contacting proximity sensitive surface 203 of interactive display 202.

Proximity image 205 can be provided in a "raw" form with little or no processing of data sensed at each pixel. Proximity image data in proximity image 205 can also be processed in optional operation 104. Processes that may be applied in operation 104 include suppressing unwanted, intermittent noise such as by smoothing (e.g., spatially or temporally) to or filtering proximity image data in proximity image 205 in any suitable manner. With reference to both FIGS. 1 and 2, for example, proximity image data captured at different times may be averaged together so as to average out or smooth proximity image 205. One example smoothing technique is to use an exponentially weighted moving average.

An additional optional process shown here as operation 106 is to apply threshold filtering to the image data in proximity image 205 so as remove extraneous pixels that do not really correspond to actual locations of an object such as finger 204 touching or being proximate to interactive display 202. For instance, values below a certain value may be removed (e.g., set to zero). In the illustrated example, proximity image data for pixels in proximity image 205 having intensities below 1 may be set to a zero value. The threshold value may be determined through experimental data to determine which intensity values are likely to correspond to false touch points for any given touch screen technology and/or device, as well as different users or environments.

Proximity "blobs" such as blob 208 may be identified in operation 108. Typically, a blob comprises a discrete area of proximity image data 205 in which a generally continuous set of pixels has proximity data indicative of proximity to an object such as a finger. For example, if two fingers are touching proximity sensitive surface 203 of interactive display 202, there would be two regions of the proximity image 205 that would be identified as blobs that correspond to capacitive (or other touch measurement) activation. In the example shown in FIG. 2, blob 208 is the only blob in proximity image 205.

Any suitable technique for identifying a blob 208 can be used. One technique includes analyzing the proximity coordinates (in pixels) reported by a proximity sensing controller or sensor and then mapping these coordinates to the pixels of proximity image 205. For each touch coordinate, a flood fill operation (also known as a "seed fill") can be used so that only activated touch pixels allow the flood to continue, resulting in a contiguous region containing only active touch pixels.

In general, a blob 208 can be identified by defining an outline around the outermost pixels. Another technique that allows the identification or segmentation of touch blobs 208 is called connected components labeling (also known as connected-component analysis, blob extraction, region labeling, blob discovery, or region extraction). The result of this operation 108 is the determination of a "blob" of touch pixels contained within a bounding box or bounding area for each area where an object has been positioned proximate to proximity sensing surface 203.

Figure 3:
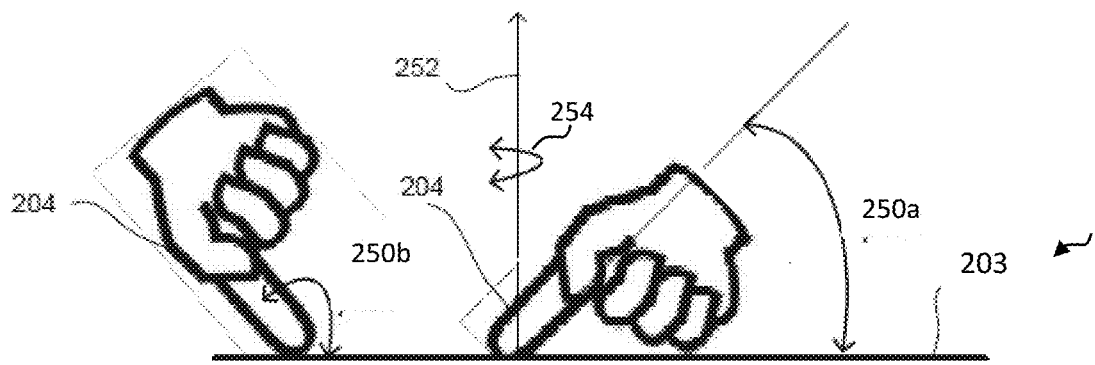
FIG. 3 illustrates a finger having a pitch and a yaw with respect to proximity sensitive surface.

FIG. 3 illustrates a finger 204 interacting with a proximity sensitive surface at a plurality of different pitches. A finger 204 will have both a pitch and a yaw with respect to proximity sensitive surface 203. In the example shown here, finger is illustrated having two pitches 250a and 250b, while in this example yaw may be determined with respect to the rotational angle 254 around axis 252. Finger 204 is shown interacting with proximity sensitive surface 203 at mirror image pitches: a first pitch 250A is shown that is acute to proximity sensitive surface 203 and second pitch 250B is shown as being obtuse to proximity sensitive surface 203. Accordingly, the blob images sensed by proximity sensitive surface 203 will be similar. While such blob images have valuable uses—such as in a twisting interaction where the extent of the interaction is determined relative to a starting position, greater precision and optionally discrimination between a range of possible initial yaw orientations may provide for more nature and more effective interactions in certain applications.

Proximity Image Data Transformations

A plurality of transformations is created for proximity image data associated with proximity image 205 in each identified blob 208 in operation 110. These transformations can be made for all of the proximity image data associated with proximity image 205 or for only such proximity image data as is associated with one or more identified blob 208 in proximity image 205. The different transformations can yield different results and analysis of these transformations provides information to help better correlate sensed proximity image data to the physical relationship between a finger or other object and the proximity sensing surface. For example, and without limitation such a correlation can be used to yield different centroids for later disambiguating the yaw as further described below.

There are a wide range of possible transformations of proximity image data associated with identified blob 208. For the purposes of illustration non-limiting examples of possible transformations are shown in operation 110 in FIG. 1. As is shown in FIG. 1, one or more transformation may take the form of a power transformation 112. Transformations of data associated with identified blobs to various powers including for example 0, 1, 2, 3 etc. As is also shown in FIG. 1, one or more logarithmic transformations 114 may be applied to the blob image data and additionally or optionally one or more threshold transformations can be applied each having a different level of thresholding to identified blobs. For example, all pixels above a certain value can be set to 1, while all other pixels are set to 0. Another possible blob transformation is to apply a log transform image data associated with a blob or an entire image. Other mathematical operations are possible (e.g., square root, squared, addition, subtraction, etc.). It is also possible to apply a variety of convolutions to the proximity image data, such as a Gaussian blur.

In the example that is illustrated in FIG. 2, proximity image data associated with blob 208 is illustrated as being transformed into two new transformation representations in operation 110. Here a first threshold transformation 116a is applied to proximity image data associated with blob 208 to yield first transformation image 207a while the same proximity image data associated with blob 208 is also transformed into a second transformation image 207b in a second transformation operation 116b. In this non-limiting example, first transformation 116a repopulates blob 208 by favoring higher intensity values while excluding lower intensity values to form first transformation blob image data 208a (e.g., high capacitive response values). In this example, second transformation image 116b can, for example and without limitation, include a wider range of intensity values (e.g., difference capacitive response values). In this example, second transformation 116b also optionally flattens intensity values associated with blob 208 so that all pixels are equally weighted.

In the example of FIG. 2, an example of a first threshold transformation 116b is shown in which proximity image data associated with proximity image 205 in which all proximity image values below some threshold are set to zero while all other proximity image values remain unchanged. This technique yields a conservative blob segmentation result, weighing most heavily the intense (e.g., central) pixels. An example of this is shown in FIG. 2 in which the first transformation transforms proximity image data for pixels in blob 208 having an intensity value below 3 to a value of 0 while maintaining the values for the proximity image data at pixels having a value equal to or greater than 3 at their current value. This yields a first transformation image 207a.

First threshold transformation 116a thus filters less intense pixels while maintaining peaks and valleys in the higher intensity values. The threshold first transformation 116a may be selected based on any suitable factor, such as which values tend to result in a centroid that only includes the innermost and highest activated touch pixels. Further, first threshold transformation 116a can be calibrated against other threshold transformations such as second transformation 116b so as to produce significantly different centroid estimations for objects that are not perpendicular to a surface. It will be appreciated from this that first threshold transformation 116a can also be used as a part of a process to identify blobs in the proximity image data of proximity image 205.

In the example of FIG. 2, second threshold transformation 116b is used to convert the data from proximity image data in proximity image 205 into a second transformation image 207b by setting intensity values in proximity image data 205 that are below a predefined threshold to zero while all values above the predefined threshold are set to a common value in the second transformation image 207b, regardless of their magnitude.

In this example, the threshold used in second threshold transformation 116b is set to be lower than the threshold used in first threshold transformation 116a. This second threshold transformation 116b allows for lesser-activated pixels (which tend to surround touch contacts or result from being proximate to an object, but not physically in contact with each other) to be included in second transformation blob image 207b.

Additionally, in second transformation image 207b all values greater than the threshold are set to a common value therefore pixels are weighted equally (i.e., without this, central pixels tend to have higher values). That is, the peaks and valleys are removed by setting most pixels to a same value (while zeroing out very low values). Second transformation image 207b shown in FIG. 2 is the result of transforming intensity values that are equal or higher than 1.0 to a value of 1.0, while transforming all other pixels to a value of 0. The threshold for second transformation 116b may be selected based on any suitable factor, such as which threshold tends to result in a more generous inclusion of pixels, especially relative to the first transformation (e.g., in this example the second transformation is more inclusive than the first transformation).

The following operations are described with respect to being performed on transformations of image data for a proximity image 205 having a single blob 208. However, it is understood that where proximity image 205 contains more than one blob 208 data associated with each blob 208 may be processed as described below to determine pitch and yaw for multiple objects on or adjacent to proximity sensitive surface 203.

It will be appreciated that the image data transformations illustrated in FIG. 2 are exemplary only and not limiting.

Determining Features

After proximity blob transformation operation 110 is complete, the determination of features of image data associated with each transformed blob image is performed in operation 120. In the example of FIG. 1, a plurality of different features is specifically noted. This too is exemplary and is not limiting.

One example of a feature that may be determined for a blob is a blob moment. The moment can be analogized generally to a weighted average of the pixel intensity values. Mathematically, a moment can be defined as a quantitative measure of a set of point features, such as intensity values. For example, the "second moment", or more specifically the "second central moment" measures the "width" (in a particular sense) of a set of points in one dimension, or in higher dimensions measures the shape of a cloud of points as it could be fit by an ellipsoid. Other moments describe other aspects of a distribution such as how the distribution is skewed from its mean. Any distribution can be characterized by a number of features (such as the mean, the variance, the skewness, etc.), and the moments of any variable's probability distribution are related to these features. The probability distribution itself can be expressed as a probability density function, probability mass function, cumulative distribution function, feature function, or moment-generating function.

Other blob features that can be computed from a blob's moment include its centroid and orientation. As shown, a moment of intensity for one or more of the transformed blobs may be computed in operation 122.

Raw image moments for a two dimensional image with pixels having intensity values I(x,y) may be defined by:

$$M_{ij} = \Sigma_x \Sigma_y x^i y^j I(x,y) \quad \text{Equation [1]}$$

Similarly, the central moments of a digital image may be defined by:

$$\mu_{pq} = \Sigma_x \Sigma_y (x-\bar{x})^p (y-\bar{y})^q f(x,y) \quad \text{Equation [2]}$$

Using the moments, a series of image features may then be determined for each transformed blob. For example, a centroid of may be computed in operation 124. The centroid is generally defined as the weighted center of the transformed blob. For example, a pixel with a value of 4 will have 4 times the value of a pixel with a value of 1.

Accordingly, in the example of FIG. 2, a first centroid 210a of a first transformation blob 208a will be determined based upon the spatial distribution of the pixels and the relative weights such as the intensities of the pixels. However, in the example of FIG. 2, second transformation blob 208b has optionally been transformed in a manner that results in a blob with pixels a common weighting. Since all pixels of the second transformation image are equally weighted, a second centroid 210b of second transformation blob 208b is the geometric center of second transformation blob 208b. First transformation blob 208a, in contrast, will have a first centroid 210a that is weighted towards the higher value pixels (e.g., corresponding to the higher capacitive response portion). The first centroid 210a for first transformation blob 208a, may be defined by:

$$\{\bar{x}, \bar{y}\} = \left\{ \frac{M_{10}}{M_{00}}, \frac{M_{01}}{M_{00}} \right\} \quad \text{Equation [3]}$$

Another feature that may be determined for one or more of the transformed blobs is a theta value which is determined in the embodiment of FIG. 1 in operation 126. Theta or the orientation of a transformed blob may be determined by first determining the second order central moments in Equations [4]-[6] to construct a covariance matrix in Equation [7]:

$$\mu'_{20} = \frac{\mu_{20}}{\mu_{00}} = \frac{M_{20}}{M_{00}} - \bar{x}^2 \quad \text{Equation [4]}$$

$$\mu'_{02} = \frac{\mu_{02}}{\mu_{00}} = \frac{M_{02}}{M_{00}} - \bar{y}^2 \quad \text{Equation [5]}$$

$$\mu'_{11} = \frac{\mu_{11}}{\mu_{00}} = \frac{M_{11}}{M_{00}} - \bar{x}\bar{y} \quad \text{Equation [6]}$$

$$\text{cov}[I(x,y)] = \begin{bmatrix} \mu'_{20} & \mu'_{11} \\ \mu'_{11} & \mu'_{02} \end{bmatrix} \quad \text{Equation [7]}$$

Eigenvectors and eigenvalues can also comprise features of the blobs that may be useful in analysis and can be determined in operation 128. The eigenvectors of this matrix correspond to the major and minor axes of first transformation blob 208a, so the orientation or theta can be extracted by the eigenvector associated with the largest eigenvalue by:

$$\theta = \frac{1}{2} \arctan\left( \frac{2\mu'_{11}}{\mu'_{20} - \mu'_{02}} \right) \quad \text{Equation [8]}$$

Eigenvalues for first transformation blob 207a may also be computed. For example, the eigenvalues of the covariance matric of Equation [7] above can be represented as follows:

$$\lambda_i = \frac{\mu'_{20} - \mu'_{02}}{2} \mp \frac{\sqrt{4\mu'^2_{11} + (\mu'_{20} - \mu'_{02})^2}}{2} \quad \text{Equation [9]}$$

Where $\lambda_i$ are the eigenvalues for first transformation blob.

FIG. 2 further illustrates first centroid 210a and a first theta having two directions 209a and 209b computed for first transformation blob 208a in first transformation image 207a. Likewise, FIG. 2 illustrates and example of a second centroid 212 for second transformation blob 208b in second transformation image 207b.

Determining Pitch

FIGS. 4A-4D, illustrate finger interactions with a proximity sensitive surface 203 at a variety of different pitches while FIGS. 5A-5D illustrate hypothetical blob images obtained at the pitches illustrated in FIGS. 4A-4D respectively. FIG. 4A illustrates a finger 204 at a pitch 256a of 90 degrees relative to proximity sensitive surface 203 of interactive display 202 when sensed by proximity sensitive surface 203, FIG. 4B illustrates a finger 204 at a second pitch 256b of about 45 degrees, FIG. 4C illustrates a finger at a pitch of 256c of about 30 degrees relative to proximity sensitive surface 203 and FIG. 4D illustrate a finger 204 that is at a pitch 256d of about 0 degrees relative to proximity sensitive surface 203. Additionally, if the device or interface orientation is known, it is also possible to interpret positions of finger 204 as exceeding 90° relative to the device or interface orientation when finger 202 rotates beyond perpendicular pitch 256a of 90 degrees.

Further, finger 204 is an elongate object and as is shown in FIGS. 4B, 4C and 4D, as finger 204 moves from a normal pitch 256a of 90 degrees toward pitches 256b, 256c and 256d that are increasingly more acute relative to proximity sensitive surface 203 of interactive display 202, a greater length of finger 204 moves into positions where the length can be sensed by proximity sensitive surface 203.

FIGS. 5A-5D illustrate hypothetical blob images 208a, 208b, 208c and 208d sensed by proximity sensitive surface 203 when finger 204 is positioned as illustrated in FIGS. 4A, 4B, 4C and 4D respectively relative to proximity sensitive surface 203 of interactive display 202.

Finger 204 comprises a skin covered fleshy mass supported by an asymmetrical bone structure. Accordingly, when finger 204 is at a normal pitch 256a of 90 degrees relative to proximity sensitive surface 203 as is shown in FIG. 4A, asymmetries in finger 204 will cause a width 260a of blob 208a to be larger than a length 262a of blob 208a. However, a greater length of finger 204 is sensed by proximity sensitive surface 203 at more acute pitch angles such as pitches 256b, 256c, and 256d as is shown in FIGS. 4B, 4C and 4D and this is reflected a blobs 208b, 208c and 208d having ever increasing lengths such as lengths 262b, 262c and 262d illustrated in FIGS. 5B, 5C and 5D.

Accordingly, during a first range of pitch angles, a blob 208 and various transformations of blob 208 will have a major axis that is defined by asymmetries of a tip portion of a finger 204. Similarly, during a second range of pitch angles as pitch angle relative to proximity sensitive surface 203 decreases, the major axis of blob 208 will transition from being defined by geometries at the tip of finger 204 to being defined by an extent to which a length of finger 204 is sensed by proximity sensitive surface 203.

These changes will be reflected in transformations of blob 208. As pitch angle decreases, there will be a further increase and higher magnitude of the first eigenvalue. Thus, a length of a transformed blob and first eigenvalue of the transformed blob can be correlated to the pitch between the proximity sensitive surface 203 and finger 204 (or other object). This correlation can be used to inform a determination of a pitch.

However, this first eigenvalue is not necessarily determinative of pitch and other features of blob 208 may also inform a determination of the pitch of an object. In embodiments, an eccentricity of transformations of blob 208 can be used to help to normalize the first eigenvalue and derive pitch. In general, the eccentricity is a measure of the ratio of a minor and a major axis of blob 208 (or longest and shortest radii) of blob 208. In embodiments, the eccentricity of blob 208 (or transformations thereof) can be averaged with the magnitude to inform a determination of the pitch of finger 204.

A distance between the centroids of two or more transformations of blob 208 may also be used to inform a decision about the sensed pitch.

In one example, analysis of data from blob 208 or data derived from blob 208 such as first transformed blob image 208a or second transformed blob image 208b is performed to determine additional blob features or data sets, As is generally described above, transformations of the data from blob 208 can include:

a power-transformed dataset which may be calculated as follows:

$$S_i = \{(x,y,z^i) | x,y,z \in B\} \text{ for } i=0,1,2$$

a thresholded power-transformed dataset which may be calculated, as follows:

$$T_i = \{(x,y,z^i) | x,y,z \in B, z \geq 30\} \text{ for } i=0,1,2$$

and a log-transformed dataset which may be calculated as follows:

$$U = \{(x,y,\ln z) | x,y,z \in B\}$$

An ellipsoid may then be fitted to each data set by computing the centroid (x,y) where:

$$\bar{x} = \frac{\sum_{x,y,z} xz}{\sum_{x,y,z} z}, \ \bar{y} = \frac{\sum_{x,y,z} yz}{\sum_{x,y,z} z}$$

Central image moments ($\mu_{02}$, $\mu_{20}$, $\mu_{11}$) may also be fitted to each data set where:

$$\mu_{ij} = \Sigma_{x,y,z}(x-\bar{x})^i(y-\bar{y})^j z.$$

From the central image moments, ellipsoid orientations may be computed as follows:

$$\theta = -\frac{1}{2}\tan^{-1}\frac{2\mu_{11}}{\mu_{20}-\mu_{02}},$$

Further, eigenvalues may be determined:

$$\lambda_{\pm} = \frac{\mu_{20}+\mu_{02} \pm \sqrt{4\mu_{11}+(\mu_{20}-\mu_{02})^2}}{2}$$

Finally, in this example, the ellipsoid's eccentricity may be determined:

$$\varepsilon = \sqrt{1-\lambda_-/\lambda_+}$$

In this example, these parameters are combined with the distance and angle between the touch point and the ellipsoid centroid to obtain a set of six features for each of these seven datasets to obtain 42 features for use in determining pitch and yaw. This however is not limiting.

Determination of the pitch within a range of accuracy based upon such data sets can be useful for a variety of commercially valuable applications. However, when pitch can be determined with greater accuracy, applications of greater complexity and precision become possible and it is useful to address other limitations of a proximity sensing based system.

In one aspect such precision may be limited by systemic limitations of proximity sensitive surface 203. It will be appreciated that, a capacitance sensing type of proximity sensing surface 203 senses electric field strength differences. These decrease with the square of the distance between the proximity sensitive surface and the finger or other object and sensed capacitance also decreases. Due to the differing dielectric constants of glass and air, however, the decrease does not perfectly fit an inverse-square model. This can cause an image having a blob 208 sensed by a capacitive proximity sensitive surface to have data (noise) that does not reflect the actual distance between the finger or other object and the proximity sensing surface at the time of sensing. Other sources of such noise are present in other types of proximity sensing surfaces and may create unintended data. Such data may lead to errors in the estimation of the pitch that can reduce pitch determination accuracy.

A multi-dimensional regression model is applied to the features determined from blob 208, or a transformed blob such as first transformed blob 208a or second transformed blob 208b and this multi-dimensional regression model is used to determine a pitch estimate in operation 142.

The multi-dimensional regression model may take the form of a multi-dimensional heuristic regression generated based upon data obtained during experimental exposure of the proximity sensitive surface or a plurality of similar proximity sensitive surfaces to elongated interface objects. In one non-limiting example of this, one or more proximity sensitive surfaces of a type to be used in an application may be exposed to an exemplar elongated interface object at a plurality of different positions relative to the one or more proximity sensitive surfaces. Proximity images may be obtained for such positioning and such proximity images may be subject to transformations as described herein to obtain a plurality of transformation images. Proximity blobs may be identified in such transformation images and features associated with the identified proximity blobs may be determined and regressively associated with known pitches of an elongated interface object relative to the proximity sensitive surface.

The regression analysis yields a multi-dimensional heuristic regression model that can be used to more accurately correlate a pitch of an elongated interface object relative to a proximity sensing surface. This model may be expressed in any logically applicable manner. The multi-dimensional heuristic regression model may be expressed in a variety of forms and may appear in the form of an algorithmic, logical or functional expression. The model may take the form of a logical truth table, which may in some embodiments include so-called "fuzzy logic" analysis, a mathematical function or algorithmic expression that determines a pitch based upon the features of the identified blobs and the multi-dimensional heuristic regression model.

In application, a plurality of features is determined from the plurality of transformations which can be determined for example and without limitation from first transformation blob 208a and second transformation blob 208b and applied to the multi-dimensional heuristic regression model to determine pitch.

The multi-dimensional regression model is then applied to a plurality these calculated features allowing increased accuracy in the determination of pitch while reducing the variability introduced by sensor variations. The regression model receives as inputs a plurality of determined features of blobs 208 or transformations thereof and provides as an output a pitch determination which may be a pitch estimate.

In embodiments, one or more techniques may be used to temporally or spatially adjust the pitch estimate to determine a final pitch value in operation 144. Multiple pitch determinations may be averaged together to get a more stable or more accurate result.

Additionally, an estimated pitch value determined using the regression model may be adjusted according to predetermined calibration curve intended to reduce variability caused by variations in fingers 204 used to interact with proximity sensitive surface 203. For example, ground truth or experimental pitch data can be collected from test users and used to calculate a regression curve that can be used to map the initial pitch estimate to a more refined finger pitch value. Other calibration data from other test objects, such as a stylus, may also be used to calculate regression curves for use of calibrating pitch for other types of objects, such as a stylus. Additionally, ground truth data can be captured for test users with different finger sizes, and used to calculate a regression curve, mapping finger size to a pitch scaling coefficient for different finger sizes. The magnitude of the first eigenvector can also be normalized against the magnitude of the second eigenvector to mitigate differences in user finger size.

Determining Yaw

Returning to FIG. 1, a process for determining yaw 150 is provided that makes use of the determined pitch. In the embodiment of FIG. 1, a theta value is computed for one or more of the transformed blobs and a product of this computation may be used to provide a basic estimate of yaw for each blob in operation 152. In the example of FIG. 2, this yaw estimate corresponds to image intensity orientation of first transformation blob 208a. However, this intensity orientation is insufficient to determine finger yaw alone, as theta values only have a range of 180 degrees, which means that the theta value is bidirectional (e.g., theta directions 209a and 209b). Thus, two different opposite finger orientations can result in a similar blob shape and orientation and a yaw estimate therefore has ambiguity. For instance, a theta of 40 degrees implies a finger could have a yaw of 40 degrees or 220 degrees (e.g., there is ambiguity to which way the finger is truly pointing).

Embodiments resolve the theta angle ambiguity. For example, a finger yaw estimate spanning all 360 degrees can be provided. In the example of FIG. 2, two centroids 210a and 210b were determined for first transformation blob 208a and second transformation blob 208b. For finger touches that are perpendicular to proximity sensitive surface 203 of interactive display 202, the centroids will largely converge at the same point (±some error). However, when finger 204 is not perpendicular to the touch screen, the centroids spread apart, generally aligned along the major axis of the blob image intensities. The flatter the pitch, the more divergent the centroids, due to different transformation be used.

In the illustrated embodiment, a vector is calculated between the two centroids and the vector direction is used to disambiguate the yaw estimate in operation 154. In one implementation, a centroid vector 212 is created between the first centroid 210a and the second centroid 210b blob image centroids. As shown in FIG. 2, centroid vector 212 is formed from first centroid 210a to the second centroid 210b. That is, the direction of the centroid vector 212 is defined as passing from first centroid 210a and then through the second centroid 210b.

Though coarse, this centroid vector 212 tends to provide a true finger yaw or direction (spanning 0-360 degrees). This centroid vector can be used as an estimate of yaw. However, the results are often noisy for an object, such as a finger. Rather than using this raw centroid vector value 212, an alternative method uses this centroid vector 212 to disambiguate the yaw (208a and 208b) that was determined from the aforementioned theta value calculated previously (e.g., the first blob transformation's theta). That is, the centroid vector may be used to choose one of the two possible ambiguous directions that can correspond to theta (209a or 209b). This can be done by using the minimum angular distance to the centroid vector as a way to select one of the two directions suggested by theta. As shown, direction 209a is selected based on the centroid vector 212.

A result of this process is a 0-360 degree finger yaw estimate.

While this result is commercially viable and particularly useful in many applications, additional accuracy and reliability in the determination of a yaw estimate will be useful in many situations. Accordingly, in the embodiment that is illustrated in FIG. 1, an additional yaw determination operation 154 is performed to using the pitch information provided by the pitch determination process operation 140 and the yaw estimate from operation 152.

In one example of this, a first yaw is determined in operation 152 as described above. However, in operation 154, a pitch refinement is used to potentially adjust the pitch estimate. In one example of this, a first yaw is determined based upon the initial yaw estimate when the pitch determining process 140 determines a first pitch that is within a first pitch range and a second yaw is determined based upon the initial yaw estimate when pitch determining process 140 determines a pitch that is within a second pitch range. The first pitch range is different than the second pitch range and the first yaw is different than the second yaw.

In one potential example of this, when the pitch of a finger 204 or other elongate interface object is, for example, in a first range of pitches below about 40° relative to proximity sensitive surface 203, and the yaw estimate is within a first range, then the yaw estimate will be adjusted to a first extent. However, when the determined pitch is at or above about 40° relative to the proximity sensitive surface 203 and the yaw estimate will be adjusted to a second range that differs from the first extent. It will be appreciated that these pitch ranges are exemplary and that actual ranges determined for particular applications can vary based upon the needs of the application, the relative sensitivity of the proximity sensitive surface to the finger or other object. In some cases, a particular range of pitch may be associated with no yaw adjustment while another range of pitch may be associated with a current range of adjustments.

The yaw adjustment based upon a determined pitch can be executed using any form of algorithmic, logical model, functional or other logical expression executable by a processor in a proximity sensitive device.

Using this approach, the yaw of finger 204 may be determined with greater accuracy allowing more refined input during individual interactions. This may allow in certain circumstances faster interactions and a reduced number of individual interactions.

The yaw estimate for each blob 208 can optionally be temporally and/spatially adjusted in operation 156, for example, to help increase stability and mitigate noise or calibrate the signal based on any suitable technique, such as the techniques described above with respect to pitch.

Pass Values to User Interfaces/Applications

Contemporary touch screens report X/Y coordinates to operating systems, interfaces, and various applications. Certain embodiments of the present invention include providing pitch and yaw to an operating system, interface or application in operation 158, for example in a similar fashion that X/Y position is reported today (e.g., inside of a touch event).

Applications could use this additional touch data for various interactive uses. For example, games or maps could utilize a finger twist motion for zooming in and out of content, increasing or decreasing volume, to open up a photo for sharing or copying, or other functions. In a specific example, a finger can be rotated and twisted around a single point to adjust a shooting game's perspective (e.g., change angle of a gun's trajectory). Varying pitch may be used to adjust volume, change the perspective from a top-down 2D view to a ¾ths perspective 3D view, or change speed of scrolling or a game player/action.

Additionally, varying pitch may be used in a binary fashion (finger flat, or perpendicular to the screen). Toggling between a flat and steep finger pitch can be used to trigger different modes, for example to switch between panning and zooming on a map when using one hand, switch between an off and on mode using one hand, etc.

The disclosed techniques may be implemented in any suitable combination of software and/or hardware system that utilizes a touch screen device that is arranged to receive one or more touches from an interactive object, such as a finger or stylus. Examples include tablets, smart phones, smart watches, personal digital assistants (PDAs), interactive television systems, etc. An apparatus for implementing one or more portions of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general purpose machines may be used with programs written in accordance with the teachings herein, or it may be more convenient to construct a more specialized apparatus to perform the disclosed method steps.

The disclosed techniques may also be implemented in any suitable combination of software and/or hardware system that utilizes a proximity sensitive surface that is arranged to sense one or more touches or proximity interactions from one or more objects or from different parts of objects.

Figure 6:
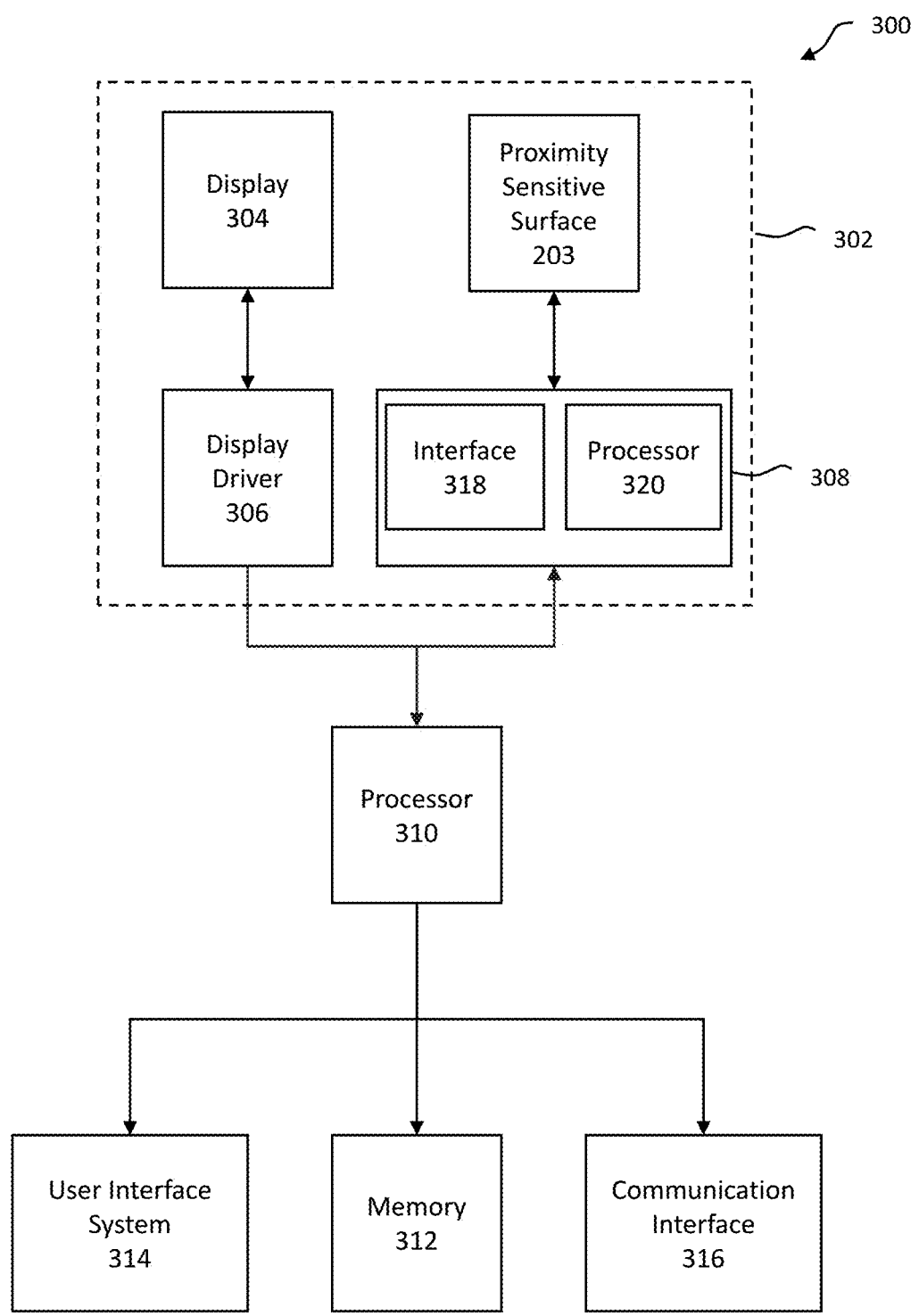
FIG. 6 illustrates an embodiment of a proximity sensitive device.

FIG. 6 illustrates one example of a proximity sensitive device 300 of a type having a proximity sensitive display system 302 using a proximity sensitive surface 203 to enable proximity sensing. In this example embodiment, proximity sensitive display system 302 has a display 304 that is capable of providing a displayed image. Display 304 can take any known form of image display including but not limited to OLED, LED, EL, Quantum Dot, and other forms of display. A proximity sensitive surface 203 that detects proximity as is generally described herein, using resistive, resistive, surface acoustic wave, capacitive, infrared grid, infrared acrylic projection, dispersive signal technology, pulse acoustic pulse registration or using other known or subsequently developed proximity sensing technologies. Display driver 306 that interacts with display 304 to cause display 304 to present a desired image and can do so using known technologies or subsequently developed display technologies.

A proximity sensor driver 308 is shown having an interface 318 that interacts with proximity sensitive surface 203 so that objects that are sensitive to proximate to proximity sensitive surface 203 within a predetermined sample period are sensed, so that signals from proximity sensitive surface 203 that are indicative of which portions of the proximity sensitive surface 203 sensed a proximate object during the sample period are generated and converts the signals received into proximity image data or signals that can be sent to processor 310 from which processor 310 can determine proximity image data. In embodiments, the functions of display driver 306 and proximity sensing driver 308 may be integrated into a single driver system or may be performed at least in part by processor 310.

In still other embodiments, proximity sensor driver 308 optionally includes a driver processor 320 processor capable of performing the method of FIG. 1 or other claimed embodiments described herein such that pitch and yaw information may be reported by the proximity sensor driver 308 to processor 310. This embodiment can be used to relieve processor 310 from the burden of making real time pitch and yaw calculations as well as for other beneficial purposes.

System 300 also includes a processor 310 which may take the form of, for example, one or more central processing units. Processor 310 may be of various types including microcontrollers and microprocessors such as programmable devices (e.g., CPLDs and FPGAs) and unprogrammable devices such as gate array ASICs or general-purpose microprocessors. More than one processor may be used in system 300 and in embodiments a single processor may be dedicated one or more of the functions of driving proximity sensing surface 203 and determining a pitch and yaw of an elongated interface object relative to a proximity sensitive surface 203 and this regard may constitute a proximity interface driver.

Processor 310 may also be coupled to a memory 312 which may take the form of a semiconductor memory and an optional user interface system 314 that connects to or provides connections to other input/output devices such as such as video monitors or displays, track balls, mice, keyboards, microphones, touch-sensitive displays, transducer card readers, magnetic or paper tape readers, tablets, styluses, voice or handwriting recognizers, or other well-known input devices such as, of course, other computers. It will be appreciated that in certain embodiments Processor 310 optionally may be coupled to an external device such as a database or a computer or telecommunications network using a communication interface 316 such as an external connection or such as a communication module such as a wired or wireless communication circuit or system. With such a connection, it is contemplated that processor 310 might receive information from the network, or might output information to the network in the course of performing the method steps described herein. Processor 310 may also be coupled with any other suitable internal devices, such as a GPS device or NFC device.

Embodiments of the present invention may be implemented in any suitable network systems. The network may take any suitable form, such as a wide area network or Internet and/or one or more local area networks (LAN's).

The network may be in the form of a data, mobile, cellular, plain old telephone network (POTN), or any combination thereof.

In still other embodiments of device 300 a display 304 and display driver 306 may be omitted to provide proximity sensitive surfaces 203 such as track pads, touch pads and graphics tablets with the enhanced pitch and yaw determinations provided herein.

Embodiments of the present invention may also be practiced in a wide variety of network environments including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc., or any combination thereof. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be affected or employed at different locations.

A network may also include mass storage, such as network attached storage (NAS), a storage area network (SAN), or other forms of computer or machine readable storage media, for example. Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the present invention relates to machine readable storage media that include program instructions, state information, etc. for performing various operations described herein. Examples of machine readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method for determining a pitch of an elongated interface object relative to a proximity sensitive surface, the method comprising:
   receiving proximity image data, the proximity image data corresponding to an area of the proximity sensitive surface that sensed the elongated interface object during a predetermined period of time;
   identifying a proximity blob in the proximity image data, the proximity blob associated with the area of the proximity sensitive surface that sensed the elongated interface object;
   transforming the proximity image data associated with the proximity blob using a plurality of different transformations to obtain a plurality of different transformed proximity image data associated with the blob, the plurality of different transformations including two or more of at least power transformations, logarithmic transformations, and threshold transformations;
   determining a plurality of features of the transformed proximity image data associated with the proximity blob, wherein the features include a plurality of centroids of the plurality of different transformed proximity image data;
   determining the pitch of the elongated interface object relative to the proximity sensitive surface based upon the determined features and a multi-dimensional heuristic regression model of the proximity sensitive surface; and
   determining a yaw based upon the determined features and a determined pitch and by disambiguating the yaw's direction based on the plurality of centroids.

2. The method of claim 1, wherein the multi-dimensional heuristic regression model is generated based upon heuristically determined responses of the proximity sensitive surface.

3. The method of claim 1, wherein the multi-dimensional heuristic regression model is generated based upon heuristic responses obtained during exposure of the proximity sensitive surface to elongated interface objects.

4. The method of claim 1, wherein the multi-dimensional heuristic regression model is one of a mathematical function, an algorithm, or a logical expression.

5. The method of claim 1, wherein an algorithm determines the pitch based upon the features of the plurality of different transformed proximity image data and the multi-dimensional heuristic regression model.

6. The method of claim 1, further comprising calculating initial yaw data, determining a first yaw based upon the initial yaw when the pitch is within a first range and determining a second yaw based upon the initial yaw when the pitch is within a second range wherein the first pitch range is different than the second pitch range and the first yaw is different than the second yaw.

7. The method of claim 1, further comprising calculating the yaw based upon the determined features, the determined pitch and a yaw estimate.

8. A method for operating a device driver for a proximity sensitive surface, the method comprising:
   receiving proximity image data from the proximity sensitive surface;

generating multiple different transformed proximity image data based upon the proximity image data using two or more of at least power transformations, logarithmic transformations, and threshold transformations;

identifying blob areas in the transformed proximity image data; and determining features of the transformed proximity image data associated with the blob areas, wherein the features include a plurality of centroids of the blob areas; and determining a pitch of an elongated interface object relative to a touch screen device based upon the determined features and a multi-dimensional heuristic regression model of the proximity sensitive surface; and determining a yaw based upon the determined pitch and by disambiguating the yaw's direction based on the plurality of centroids.

9. An apparatus comprising:

a proximity sensitive surface generating proximity image data corresponding to an area of the proximity sensitive surface that sensed an elongated interface object during a predetermined period of time; and a processor that is adapted to:
identify a proximity blob in the proximity image data, the proximity blob associated with the area of the proximity sensitive surface that sensed the elongated interface object;

transform the proximity image data associated with the proximity blob using a plurality of different transformations to obtain a plurality of transformed blob proximity image data, the plurality of transformations including two or more of at least power transformations, logarithmic transformations, and threshold transformations; and determine a plurality of features of the transformed blob proximity image data, to determine a pitch of the elongated interface object relative to the proximity sensitive surface based upon the determined features and a multi-dimensional heuristic regression model of the proximity sensitive surface; and to determine a yaw based upon the determined pitch, wherein the features include a plurality of centroids of the plurality of transformed blob proximity image data and wherein a direction of the yaw is disambiguated based on the plurality of centroids.

10. The apparatus of claim 9, wherein the multi-dimensional heuristic regression model is generated based upon heuristically determined responses of the proximity sensitive surface.

11. The apparatus of claim 9, wherein the multi-dimensional heuristic regression model is generated based upon heuristically determined responses during exposure of the proximity sensitive surface to elongated interface objects.

12. The apparatus of claim 9, wherein the multi-dimensional heuristic regression model is one of a mathematical function, an algorithm, or a logical expression.

13. The apparatus of claim 9, wherein an algorithm determines the pitch based upon the features of the plurality of transformed blob proximity image data and the multi-dimensional heuristic regression model.

14. The apparatus of claim 9, wherein the processor is further adapted for calculating initial yaw data, determining a first yaw based upon the initial yaw when the pitch data is within a first range and determining a second yaw based upon the initial yaw when the pitch data is within a second range wherein the first pitch range is different than the second pitch range and the first yaw is different than the second yaw.

15. The apparatus of claim 9, wherein the processor is further adapted for calculating the yaw based upon features of the plurality of transformed blob proximity image data, the pitch data and model correlating an initial yaw data and the pitch data.

16. A proximity sensing surface driver comprising:

an interface adapted to interact with a proximity sensitive surface to obtain proximity image data corresponding to an area of the proximity sensitive surface that sensed an elongated interface object during a predetermined period of time; and a processor adapted to:
identify a proximity blob in the proximity image data, the proximity blob associated with the area of the proximity sensitive surface that sensed the elongated interface object;

transform the proximity image data associated with the proximity blob using a plurality of different transformations to obtain a plurality of transformed blob proximity image data, the plurality of transformations including two or more of at least power transformations, logarithmic transformations, and threshold transformations;

determine a plurality of features of the transformed blob proximity image data, wherein the features include a plurality of centroids of the plurality of transformed blob proximity image data;

determine a pitch of the elongated interface object relative to the proximity sensitive surface based upon the determined features and a multi-dimensional heuristic regression model of the proximity sensitive surface; and determine a yaw based upon the determined features of the plurality of transformed blob proximity image data and a determined pitch and by disambiguating the yaw's direction based on the plurality of centroids.

* * * * *